United States Patent
Hicklin et al.

(10) Patent No.: US 10,415,412 B2
(45) Date of Patent: Sep. 17, 2019

(54) GAS TURBINE ENGINE

(71) Applicant: ROLLS-ROYCE plc, London (GB)

(72) Inventors: Mark J. Hicklin, Derby (GB); Neil A. Shipley, Derby (GB); Daniel J. Swan, Derby (GB)

(73) Assignee: Rolls-Royce plc, London (GB)

( * ) Notice: Subject to any disclaimer, the term of this patent is extended or adjusted under 35 U.S.C. 154(b) by 162 days.

(21) Appl. No.: 15/699,314

(22) Filed: Sep. 8, 2017

(65) Prior Publication Data
US 2018/0094531 A1   Apr. 5, 2018

(30) Foreign Application Priority Data

Sep. 30, 2016   (GB) .................................. 1616613.4

(51) Int. Cl.
*F01D 11/00*   (2006.01)

(52) U.S. Cl.
CPC .......... *F01D 11/006* (2013.01); *F01D 11/008* (2013.01); *F05D 2240/304* (2013.01); *F05D 2240/305* (2013.01); *F05D 2240/306* (2013.01); *F05D 2240/55* (2013.01); *Y02T 50/672* (2013.01)

(58) Field of Classification Search
CPC ................. F01D 11/006; F01D 11/008; F05D 2240/304; F05D 2240/305; F05D 2240/306; F05D 2240/55
USPC ....................................................... 416/193 A
See application file for complete search history.

(56) References Cited

U.S. PATENT DOCUMENTS

| 6,447,250 B1* | 9/2002 | Corrigan ............... F01D 5/3007 |
| | | 416/193 A |
| 2007/0280831 A1* | 12/2007 | Pickens ................. F01D 5/3038 |
| | | 416/220 R |
| 2014/0169979 A1 | 6/2014 | Alarcon et al. | |
| 2015/0204201 A1* | 7/2015 | Turner ..................... F01D 5/143 |
| | | 416/179 |

FOREIGN PATENT DOCUMENTS

GB   2490858   11/2012

OTHER PUBLICATIONS

Great Britain Search Report dated Feb. 14, 2017, issued in GB Patent Application No. 1616613.4.

* cited by examiner

*Primary Examiner* — Erick R Solis
(74) *Attorney, Agent, or Firm* — Duane Morris LLP

(57) ABSTRACT

A rotatable arrangement for a gas turbine engine comprises a plurality of blades having an aerofoil profile with a suction side, a pressure side, a leading edge and a trailing edge. A plurality of annulus fillers are provided between adjacent blades. A pressure side seal extends between a blade and an annulus filler on the pressure side of the blade, and a suction side seal extends between the blade and an annulus filler on the suction side of the blade. The suction side seal comprises a blocking member provided at an end of the suction side seal proximal to the trailing edge of the blade, the blocking member being configured to restrict recirculation of flow along the suction side of the blade.

19 Claims, 6 Drawing Sheets

GAS TURBINE ENGINE

CROSS-REFERENCE TO RELATED APPLICATIONS

This specification is based upon and claims the benefit of priority from UK Patent Application Number 1616613.4 filed on 30 Sep. 2016, the entire contents of which are incorporated herein by reference.

BACKGROUND

Field of Disclosure

The present disclosure concerns a rotatable arrangement for a gas turbine engine and/or a gas turbine engine.

Description of the Related Art

Gas turbine engines are typically employed to power aircraft. Typically a gas turbine engine will comprise an axial fan driven by an engine core. The engine core is generally made up of one or more turbines which drive respective compressors via coaxial shafts. The fan is usually driven off an additional lower pressure turbine in the engine core.

A fan generally includes a hub having a plurality of blades extending therefrom. Referring to FIGS. 1 and 2, annulus fillers 126 are provided between adjacent blades 124 to provide an optimal gas washed surface between the blades. A pressure side seal 128 extends along the pressure side of the blade at the interface between an annulus filler and the blade, and a suction side seal 130 extends along the suction side of the blade at the interface between another annulus filler and the blade. A gap 132 is formed at the trailing edge 134 of the blade between two adjacent annulus fillers 126.

The principle flow of air through the fan is indicated by arrows A in FIGS. 1 and 2. The flow is generally axial from a leading edge 136 to a trailing edge 134 of the blades 124. However, due to the gap 132 at the trailing edge, some of the air is recirculated around the trailing edge back along the suction side of the blade, as indicated by arrow $A_{r1}$. This recirculated air then re-enters the air flow A approximately mid-way along the chord of the blade (indicated by arrows $A_{r2}$).

This recirculation of air introduces losses into the air flow A and therefore reduces fan root efficiency.

SUMMARY

The present disclosure proposes suction side seals that seek to limit the amount of recirculated air and therefore improve efficiency of a gas turbine engine.

According to an aspect there is provided a rotatable arrangement for a gas turbine engine. The arrangement comprises a plurality of blades having an aerofoil profile with a suction side, a pressure side, a leading edge and a trailing edge. A plurality of annulus fillers are provided between adjacent blades. A pressure side seal extends between a blade and an annulus filler on the pressure side of the blade, and a suction side seal extending between the blade and an annulus filler on the suction side of the blade. The suction side seal comprises a blocking member provided at an end of the suction side seal proximal to the trailing edge of the blade, the blocking member being configured to restrict recirculation of flow along the suction side of the blade.

The suction side seal may have an axial extent greater than an axial extent of the pressure side seal. For example, the additional axial extent of the suction side seal may be provided to accommodate the blocking member.

The blocking member may be configured to move between a first position and a second position, in the first position a gap is be provided at a trailing edge of the blade and in the second position the gap is sealed. For example, it may be considered that in the first position a recirculation flow path is defined at the trailing edge of the blade, and in the second position the blocking member restricts flow along the recirculation flow path.

The blocking member may be arranged to rotate to move between the first position and the second position.

The gap at the trailing edge of the blade may be between adjacent annulus fillers.

At least a portion of the blocking member may be arranged to rotate and move axially to move from the first position to the second position.

The suction side seal may comprise an activation section and a flap. The activation section may move the flap between the first position and the second position.

The activation section may include a pleated portion. The pleated portion may be arranged such that in the first position there is a gap between the pleated portion and the suction side of the blade and in the second position the pleated portion straightens such that the previously pleated portion is aligned with and adjacent to the suction side of the blade.

In the second position the flap may extend across a gap between two adjacent annulus fillers.

In exemplary embodiments the gap may be between two adjacent annulus fillers. Alternatively, the gap may be between a trailing edge of the blade and the suction side seal.

The blocking member may be provided transverse to a principal direction of the suction side seal.

The blocking member may be provided at between 70 and 90° to the suction side seal at the trailing edge.

A gas washed surface of the blocking member may be contoured such that air flow exiting a flow path over the blocking member exits in a substantially axial direction.

The blocking member may comprise a sharp transition between the exit of a flow path over the blocking member and adjacent surfaces.

At least a portion of the blocking member may be made from rubber or an elastomeric material.

The blocking member may comprise the same material as the suction side seal. The suction side seal and/or the blocking member may comprise one or more stiffening members.

The stiffening members may be made from a material stiffer than the material of the suction side seal or blocking member. The stiffening members may be made from plastic or metal.

The suction side seal may be generally T shaped with the widest part of the seal being positioned proximal to a gas washed surface of the annulus filler.

The arrangement may be a fan. The blades may be fan blades.

According to an aspect there is provided a gas turbine engine comprising the arrangement according to the previous aspect.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
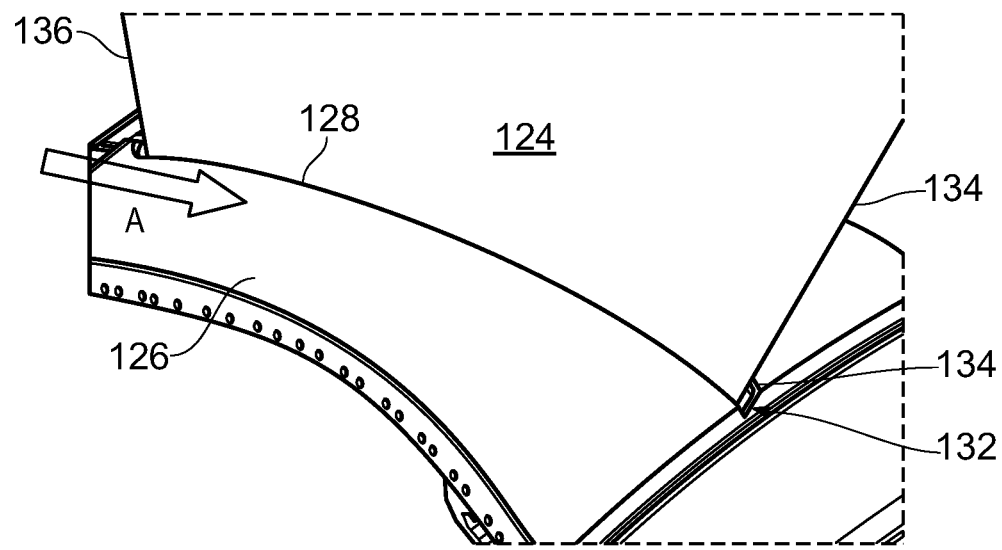
FIG. 1 is a perspective partial view of annulus fillers adjacent a blade.
Figure 2:
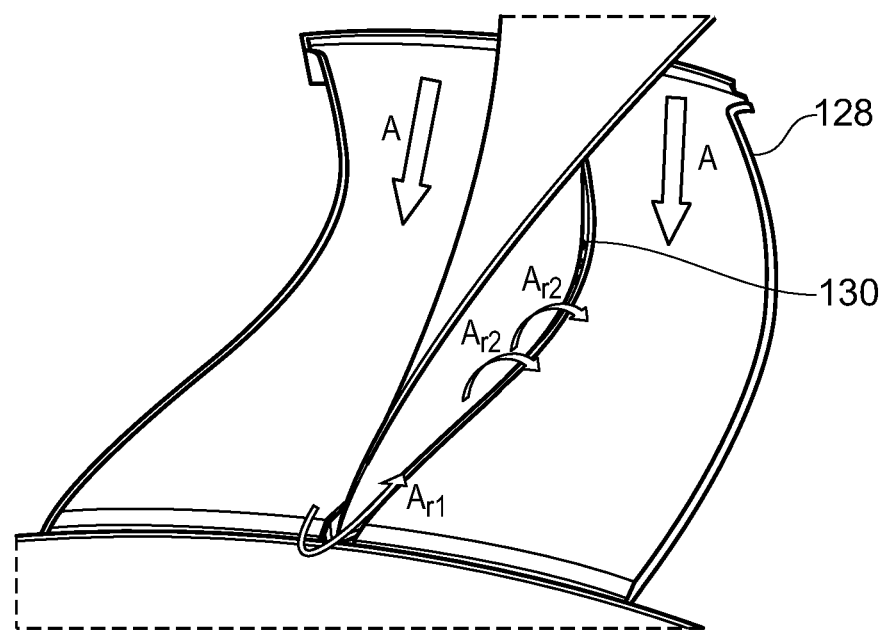
FIG. 2 is a perspective view of the annulus fillers and blade of FIG. 1, with arrows to indicate recirculation of air.
Figure 3:
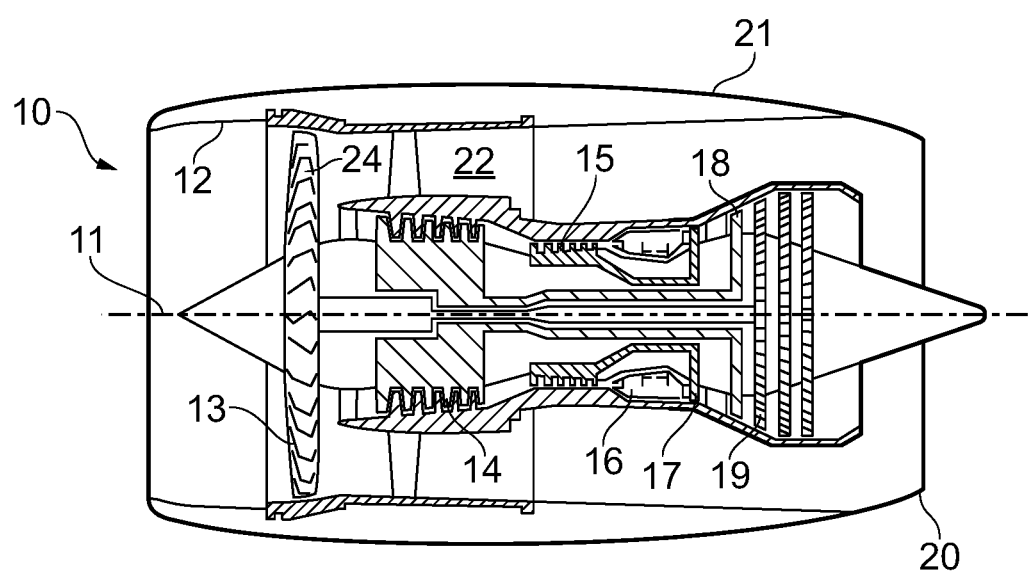
FIG. 3 is a sectional side view of a gas turbine engine.

With reference to FIG. 3, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

The fan 13 includes a plurality of blades 24. Each blade has an aerofoil profile with a leading edge, a trailing edge, and a pressure side and suction side extending between the leading edge and the trailing edge.

In the present application, a chordwise direction refers to a direction extending from the leading edge to the trailing edge; a thickness direction refers to a direction extending between the suction side and the pressure side of the blade; and a spanwise direction refers to a direction that extends from a root of the blade to a tip of a blade.

Figure 4:
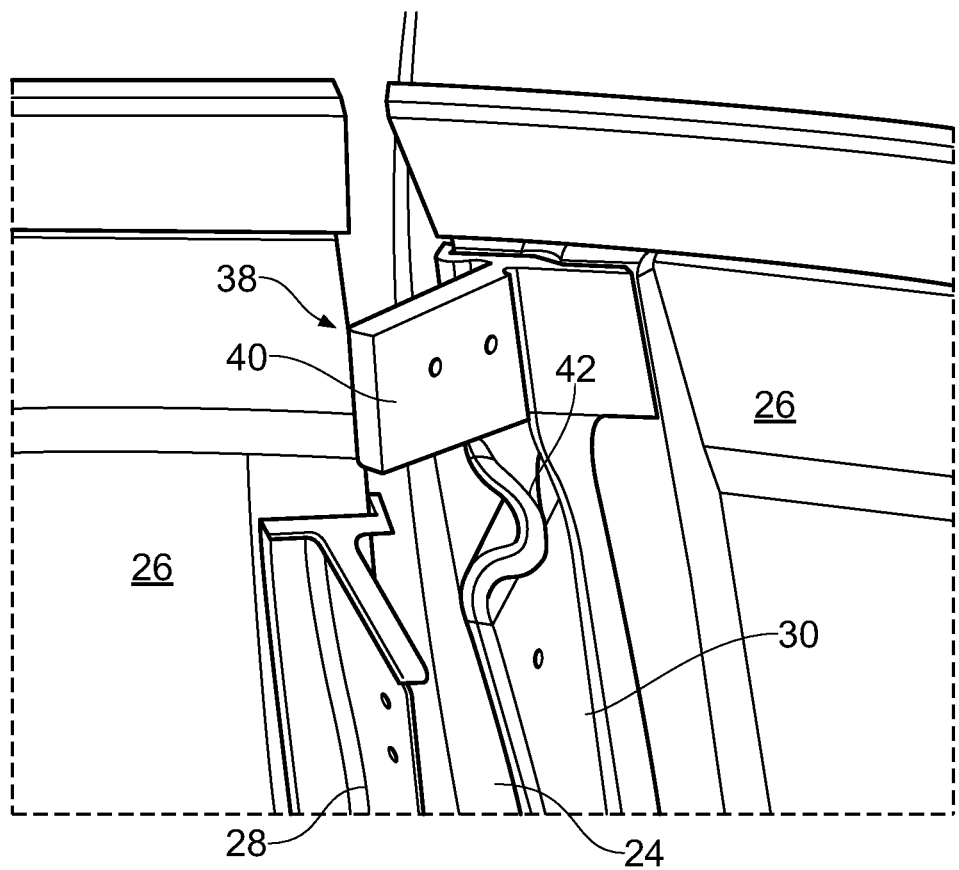
FIG. 4 is a perspective view of annulus fillers, a blade and seals between the annulus filler and blade, with a suction side seal in a first position.

Referring to FIG. 4, an annulus filler 26 is provided between each adjacent blade 24. The annulus fillers extend from a leading edge of the blade to the trailing edge of the blade. The annulus fillers extend to be adjacent a pressure side of one blade and a suction side of an adjacent blade. The fillers define a smooth gas washed surface between the blades.

Seals are provided between the annulus fillers 26 and the blades 24. A pressure side seal 28 is provided at an interface between an annulus filler and the pressure side of the blade, and a suction side seal 30 is provided at an interface between an annulus filler and the suction side of the blade. The seals generally follow the profile of the blade. The seals are generally T-shaped, i.e. the seal may be considered to have a circumferential portion and a radial portion, the circumferential portion having greatest extent in a generally circumferential direction and the radial portion having greatest extent in a generally radial direction. The circumferential portion (or widest portion) is proximal to a gas washed surface of the annulus filler. Slots 38 are provided in the annulus fillers for receiving and supporting a portion of the seal. The radial portion (or narrowest portion) of the T-shaped seal extends radially at an angle towards the blade and contacts the blade at a position radially inward of the gas washed surface (e.g. beneath the annulus filler).

In the present example, the pressure side seal has a constant cross section along the length of the blade, and substantially abuts the blade along the full length of the pressure side seal. The suction side seal 30 extends further in a chordwise direction than the pressure side seal to accommodate a blocking member defined by a flap 40 and an activation section. In this example, the activation section includes a pleated portion 42, having in this example a single pleat. The flap and pleated portion are provided at a trailing edge of the blade, with the flap being axially rearward of the pleated portion. As will be described later, during operation of the gas turbine engine, the arrangement of the blocking member means that the blocking member moves from the position shown in FIG. 4 under static conditions to the position shown in FIG. 5 under centrifugal loads.

Referring to FIG. 4, under static conditions, i.e. when the engine is at rest and the fan is not rotating, the suction side seal follows the profile of the fan blade from a leading edge to the pleated portion 42 (as it does during rotation of the fan blade). At the pleated portion 42, the suction side seal includes a region that curves away from the blade 24 such that the majority of the pleated portion does not contact the blade. The pleated portion may be considered to define a circumferentially protruding arched section. The portion of the suction side seal with the flap 40 then continues in a chordwise direction, following the principle direction of the majority of the remainder of the suction side seal (i.e. the remainder of the suction side seal excluding the pleated portion). The portion of the suction side seal having the flap has a T-shaped cross section similar to the remainder of the suction side seal, however the radial portion of the T-shape is longer than the radial portion of the T-shape of the remainder of the seal to define the flap 40. That is, in the region of the flap 40 the suction side seal may be considered to extend by a greater distance in a radially inward direction compared to the remainder of the seal.

The suction side seal is made from an elastomeric or rubber material. In the present example, a stiffening member is provided in the flap 40 to stiffen the flap. The stiffening member may be made from any material stiffer than the remainder of the suction side seal, for example a plastic, composite or metallic material. The provision of a stiffening member can improve the performance of the blocking member, but the blocking member can function without the stiffening member.

When the engine is operating the fan rotates and centrifugal loading causes the flap 40 to move to close the gap between adjacent annulus fillers 26. Centrifugal loads cause the pleated portion 42 to substantially straighten, such that no pleat is present in the suction side seal. This straightening of the pleated portion 42 causes the flap 40 to move in an axially rearward direction and to rotate towards the annulus filler adjacent the pressure side of the blade. The straightening also means that the previously pleated portion of the seal presses against the blade along the full length of the previously pleated portion.

Figure 5:
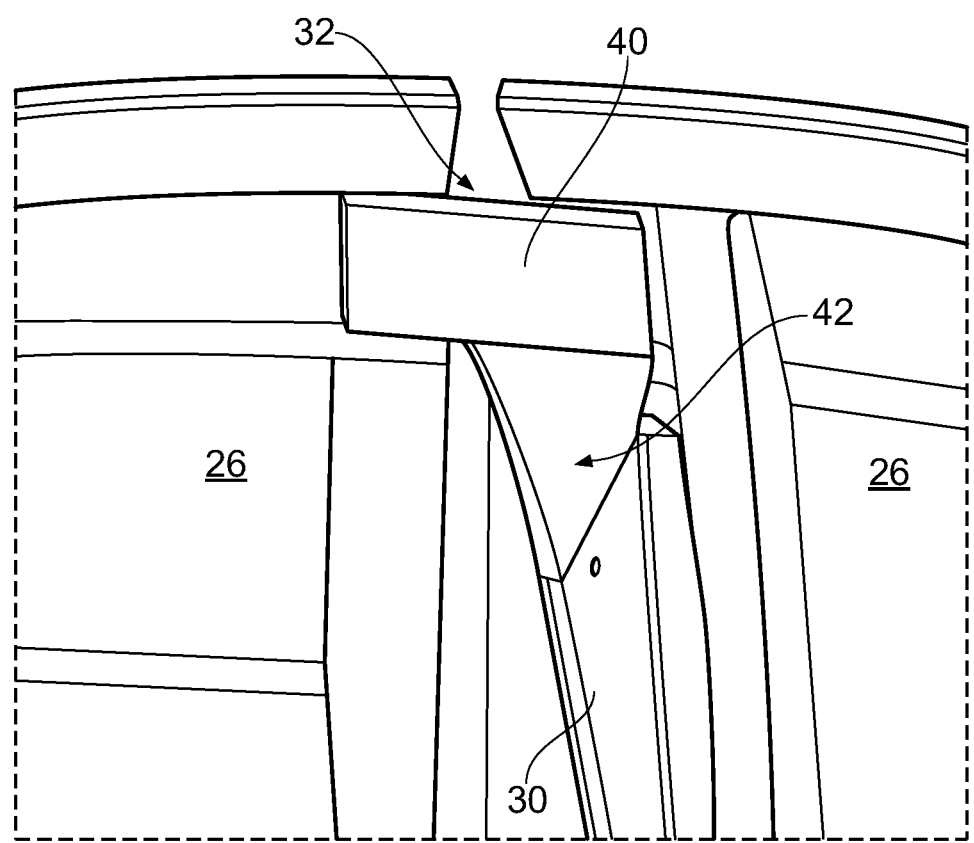
FIG. 5 is a perspective view of the arrangement of FIG. 4 with the suction side seal in a second position.

Referring to FIG. 5, the arrangement of the blocking member when the fan is rotating is illustrated. The previously pleated portion 42 of the suction side seal is substantially straightened to follow a chordwise direction of the blade 24 and abuts the blade 24. Straightening of the pleated region has caused the flap 40 to extend to a position further axially rearward of the trailing edge of the blade 24. Straightening of the pleated region has also caused the flap to twist such that it is abutting against the annulus filler on both the suction side and the pressure side of the blade. In this way, the flap 40 extends across a gap 32 that is formed between the two adjacent annulus fillers.

When the flap 40 covers the gap 32 at the trailing edge, the amount of air that recirculates at the trailing edge is reduced, which can improve engine performance. Furthermore, the previously pleated portion 42 abuts against the blade which creates an improved seal to further limit the amount of recirculating air. The pleated region and the flap are provided at the end of a suction side seal, and the remainder of the suction side seal is the same as a conventional suction side seal, in this way the provision of the flap and pleated region has minimal impact on the intended function of the suction side seal. Provision of the flap and pleated region means that the trailing edge of the blade is selectively sealed during operation of the gas turbine engine. This means that assembly of the gas turbine engine is simplified compared to if a permanent seal were provided at the trailing edge of the blade.

Figure 6:
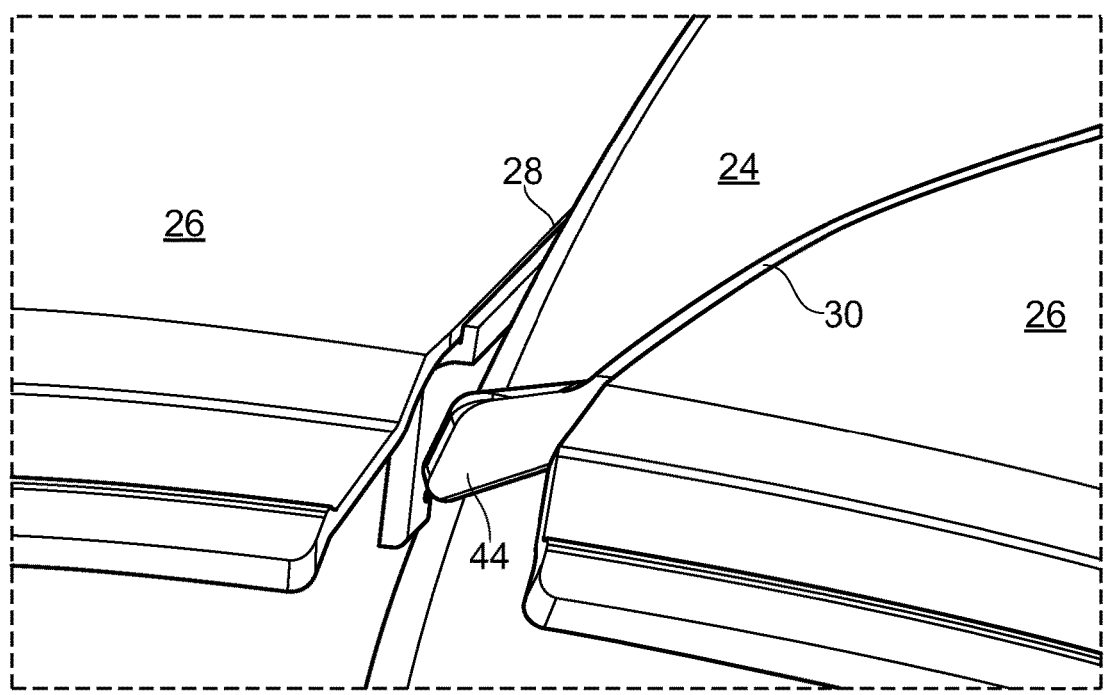
FIG. 6 is a perspective view of annulus fillers, a blade and an alternative suction side seal between the annulus filler and blade.
Figure 7:
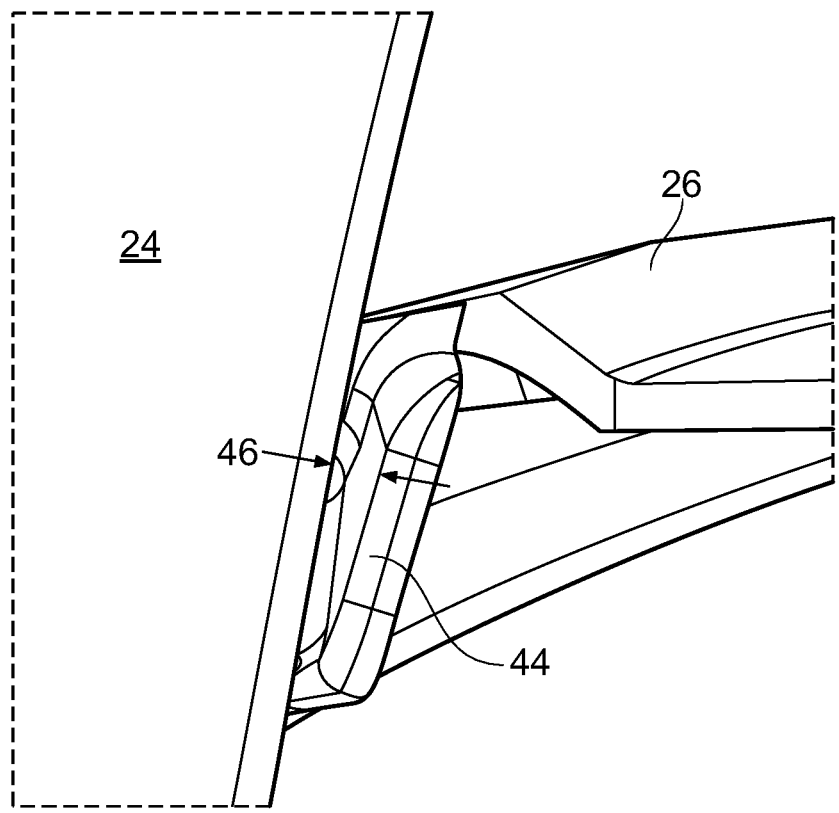
FIG. 7 is a perspective view of the arrangement of FIG. 6 with the suction side seal in a first position.
Figure 8:
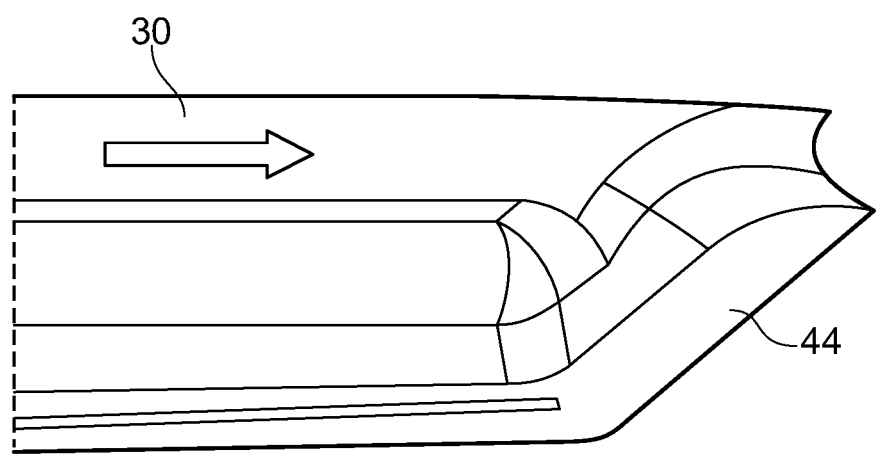
FIG. 8 is a perspective view of the suction side seal of the arrangements of FIGS. 6 and 7.

Referring now to FIGS. 6 to 8, an alternative blocking member arrangement will now be described. In this example the blocking member includes an end seal 44. The end seal 44 is provided at the trailing edge end of the suction side seal 30. The end seal is arranged to close off a passage that recirculating air would otherwise take.

The end seal 44 is provided transverse to the remainder of the suction side seal. That is, the suction side seal extends substantially in a chordwise direction and the end seal is angled so that as well as extending in a chordwise direction it extends towards the pressure side. A face of the end seal proximal to the blade is aligned in a spanwise direction with the trailing edge of the blade.

When the engine is at rest and the fan is not rotating, a gap 46 is provided between the end seal 44 and the trailing edge 34 of the blade 24. When the engine rotates, the end seal rotates about an axis between the end seal and the remainder of the suction side seal. The rotation brings the end seal in abutting contact with the trailing edge of the blade.

Referring to FIG. 8, the suction side seal includes contours that extend into the end seal. The contours are smooth and direct fluid flow along the suction side seal and over the end seal. The contours are such that the flow path of fluid flowing over the end seal is substantially axial on exiting the end seal. In particular, the flow path is axial along the suction side seal, the flow path then moves in a direction angled to the axial and spanwise direction at the end seal, but before exiting the region of the end seal, the flow path again moves in a substantially axial direction.

The transition between the contoured surface and the rearward-most face of the end seal is sharp. The provision of a sharp corner between the contoured surface and the rearward most surface further discourages recirculation of air. Similar to the previously described seal, the seal can be made from an elastomer or a rubber. In addition, a stiffening member may be incorporated in the seal, e.g. in the end seal 44. The stiffening member may be made from a material stiffer than the remainder of the suction side seal, and may be made for example from a plastic, composite or metallic material.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A rotatable arrangement for a gas turbine engine, the arrangement comprising:
a plurality of blades having an aerofoil profile with a suction side, a pressure side, a leading edge and a trailing edge,
a plurality of annulus fillers provided between adjacent blades;
a pressure side seal extending between a blade and an annulus filler on the pressure side of the blade; and
a suction side seal extending between the blade and an annulus filler on the suction side of the blade, the suction side seal having an axial extent greater than an axial extent of the pressure side seal;
wherein the suction side seal comprises a blocking member provided at an end of the suction side seal proximal to the trailing edge of the blade, the blocking member being configured to restrict recirculation of flow along the suction side of the blade.

2. The arrangement according to claim 1, wherein the blocking member is configured to move between a first position and a second position, in the first position a gap is provided at a trailing edge of the blade and in the second position the gap is sealed.

3. The arrangement according to claim 2, wherein the blocking member is arranged to rotate to move between the first position and the second position.

4. The arrangement according to claim 2, wherein the gap at the trailing edge of the blade is between adjacent annulus fillers.

5. The arrangement according to claim 4, wherein at least a portion of the blocking member is arranged to rotate and move axially to move from the first position to the second position.

6. The arrangement according to claim 4, wherein the suction side seal comprises an activation section and a flap, wherein the activation section moves the flap between the first position and the second position.

7. The arrangement according to claim 6, wherein the activation section includes a pleated portion, and the pleated portion is arranged such that in the first position there is a gap between the pleated portion and the suction side of the blade and in the second position the pleated portion straightens such that the previously pleated portion is aligned with and adjacent to the suction side of the blade.

8. The arrangement according to claim 6, wherein in the second position the flap extends across a gap between two adjacent annulus fillers.

9. The arrangement according to claim 2, wherein the gap is between a trailing edge of the blade and the suction side seal.

10. The arrangement according to claim 9, wherein the blocking member is provided transverse to a principal direction of the suction side seal.

11. The arrangement according to claim 10, wherein the blocking member is provided at between 70 and 90° to the suction side seal at the trailing edge.

12. The arrangement according to claim 1, wherein the blocking member comprises a sharp transition between the exit of a flow path over the blocking member and adjacent surfaces.

13. The arrangement according to claim 1, wherein at least a portion of the blocking member is made from rubber or an elastomeric material.

14. The arrangement according to claim 1, wherein the blocking member is made from the same material as the suction side seal.

15. The arrangement according to claim 1, wherein the suction side seal and/or the blocking member comprise one or more stiffening members.

16. The arrangement according to claim 1, wherein the suction side seal is generally T shaped with the widest part of the seal being positioned proximal to a gas washed surface of the annulus filler.

17. The arrangement according to claim 1, wherein the arrangement is a fan, and the blades are fan blades.

18. A gas turbine engine comprising a rotatable arrangement for a gas turbine engine, the arrangement comprising:
 a plurality of blades having an aerofoil profile with a suction side, a pressure side, a leading edge and a trailing edge,
 a plurality of annulus fillers provided between adjacent blades;
 a pressure side seal extending between a blade and an annulus filler on the pressure side of the blade; and
 a suction side seal extending between the blade and an annulus filler on the suction side of the blade;
 wherein the suction side seal comprises a blocking member provided at an end of the suction side seal proximal to the trailing edge of the blade, the blocking member being configured to restrict recirculation of flow along the suction side of the blade, wherein the blocking member is configured to move between a first position and a second position, in the first position a gap is provided at a trailing edge of the blade and in the second position the gap is sealed.

19. A rotatable arrangement for a gas turbine engine, the arrangement comprising:
 a plurality of blades having an aerofoil profile with a suction side, a pressure side, a leading edge and a trailing edge,
 a plurality of annulus fillers provided between adjacent blades;
 a pressure side seal extending between a blade and an annulus filler on the pressure side of the blade; and
 a suction side seal extending between the blade and an annulus filler on the suction side of the blade;
 wherein the suction side seal comprises a blocking member provided at an end of the suction side seal proximal to the trailing edge of the blade, the blocking member being configured to restrict recirculation of flow along the suction side of the blade, wherein a gas washed surface of the blocking member is contoured such that air flow exiting a flow path over the blocking member exits in an axial direction.

* * * * *